United States Patent [19]

Sörensen

[11] Patent Number: 4,829,696
[45] Date of Patent: May 16, 1989

[54] LONG LINE FOR USE IN LONG-LINE FISHING

[76] Inventor: Trondur F. Sörensen, 3870 Hvannasund,

[21] Appl. No.: 238,298

[22] Filed: Aug. 30, 1988

[30] Foreign Application Priority Data

Aug. 31, 1987 [SE] Sweden .................. 8703365

[51] Int. Cl.$^4$ .............................. A01K 91/04
[52] U.S. Cl. ............................ 43/6.5; 43/42.74; 43/43.1; 43/44.84; 43/57.3
[58] Field of Search ............. 43/44.83, 44.85, 42.74, 43/43.1, 57.3, 44.84, 44.86; 24/457, 460, 462; 403/141, 142, 69

[56] References Cited

U.S. PATENT DOCUMENTS

| | | | |
|---|---|---|---|
| 1,252,621 | 1/1918 | Smith | 43/44.85 |
| 2,766,547 | 10/1956 | Gallagher | 43/42.74 |
| 2,908,989 | 10/1959 | Povinellei et al. | 43/42.74 |
| 3,818,625 | 6/1974 | Shults | 43/27.4 |
| 4,277,905 | 7/1981 | Huse | 43/6.5 |

Primary Examiner—Nicholas P. Godici
Assistant Examiner—Michael William Starkweather

[57] ABSTRACT

A long line for use in long-line fishing, comprising a main line with detachably attached branch lines, each carrying a respective hook. The branch lines are attached to the main line via globular bodies, which are affixed to said main line and formed by rings having a spherical outer surface. Each branch line is connected to a claw-shaped body, which via a snap-in action is arranged to be brought in releasable engagement with one of the globular bodies on the main line, when the claw-shaped body is displaced along the main line with its claws gripping about said line.

5 Claims, 1 Drawing Sheet

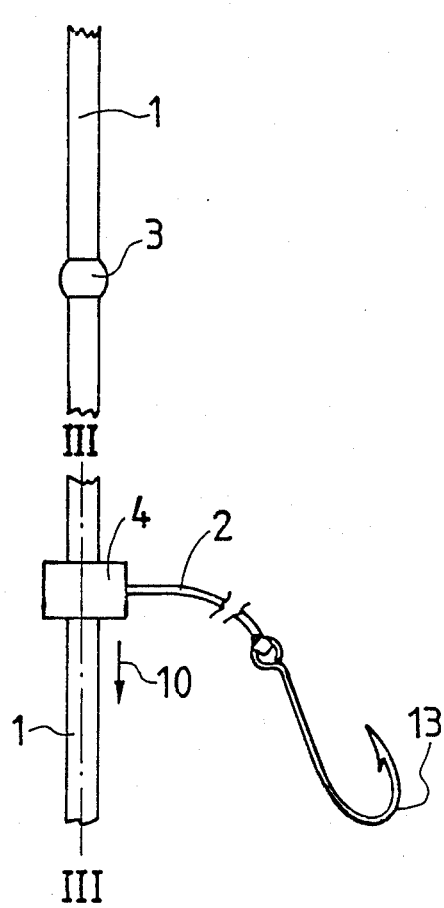
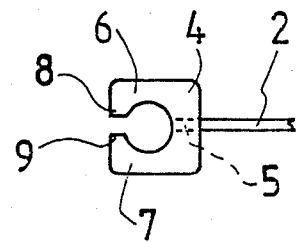
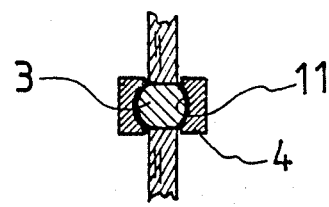
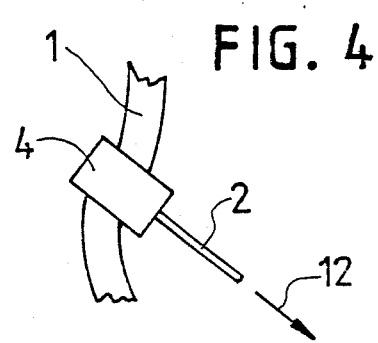

LONG LINE FOR USE IN LONG-LINE FISHING

FIELD OF THE INVENTION

This invention relates to a long line for use in long-line fishing, comprising a main line with detachably attached branch lines, each carrying a hook, said branch lines being attached to the main line via globular bodies, which are affixed to said main line and formed by rings having a spherical outer surface.

BACKGROUND OF THE INVENTION

It is known in the art to detachably attach branch lines on long lines, but all prior art methods for this attachment are based upon comparatively complex designs, which complicate the process of attaching and detaching the branch lines.

U.S. Pat. No. 4,023,302 discloses a long line, upon which globular bodies are attached at suitable intervals, each body having a peripheral groove into which the branch line is tied.

SUMMARY OF THE INVENTION

One object of the present invention is to provide a long line of simple design, which facilitates both manual and automatic attachment and detachment of the branch lines from the main line.

This object is realized at a long line of the above described type which is characterized in, that each branch line is connected to a claw-shaped body, which via snap-in action is arranged to be brought in releasable engagement with one of the globular bodies on the main line, when the claw-shaped body is displaced along the main line with its claws gripping about said line.

In this way, a long line is produced, at which the branch lines can easily be attached to the main line and later be detached from said main line, possibly by means of an automatic procedure, since in order to effect said attachment, it is only necessary to attach the claw-shaped body with its claws gripping around the main line, and subsequently displace said body along the main line until the globular body snaps into engagement with the claw-shaped body. The detachment is effected in accordance with the same practice, and is therefore very simple to perform, possibly by means of an automatically working machinery, while recovering the long-line from the sea. As a result of that the snap-in engagement between the claw-shaped body and the globular body is obtained by a displacement of the clawshaped body along the main line, an especially efficacious link between the branch lines and the main line may be achieved, in regard to absorbing pull forces in the direction of the branch line hook.

According to the invention, the claw-shaped body may preferably have notches for free swiveling reception of the globular body, resulting in that the claw-shaped body at every instant under tension rotates until it is in line with the branch line, wherein it maintains a position which ensures the best possible attachment upon the globular body.

According to the invention, the free edges of the claws may preferably have towards each other pointing protrusions.

Further according to the invention, the globular body may be affixed to the main line by direct casting, wherein the globular body does not need any further means to stay in place.

Finally according to the invention, the globular body may be symmetrically shaped and arranged in such way, that it can be moved in or out of engagement with the claw-shaped body from both sides of the claws, wherein the attachment or detachment procedure is further simplified, since the globular bodies may be attached on the main line without control of their orientation.

Other characteristics of the invention will be clear from the accompanying claims.

BRIEF DESCRIPTION OF THE DRAWINGS

One embodiment of the invention will now be described in detail with reference to the accompanying drawing, in which FIG. 1 shows a part of a long line according to the invention, with some parts removed for the sake of clearness, FIG. 2 shows a branch line attached to a globular body and seen from above, also with parts of the branch line removed for the sake of clearness, FIG. 3 is a section along line III—III in FIG. 1, and FIG. 4 is a part of the main line shown in FIG. 1, seen under tension from the direction of the branch line.

DESCRIPTION OF A PREFERRED EMBODIMENT

The long line shown in FIG. 1 comprises a main line 1 and an attached branch line 2 with a hook 13. When being used, a long line has a large number of branch lines attached at suitable intervals to the main line 1. In the drawing, for the sake of clearness, there is only shown a single branch line 2. Globular metal bodies 3 are provided at suitable intervals for the attachment of the branch lines 2, each body being shaped like a ring with a spherical outer surface.

At the end being opposite to the hook 13, each branch line has a claw-shaped body 4, in which the line which is a part of the branch line 2, is connected via a through bore 5, which has an expansion for receiving a knot on said line, in the side which is opposite to the hook.

The claw-shaped body 4 has two claws 6 and 7, having towards each other pointing protrusions 8 resp. 9. The gap between the claws 6 and 7 has such dimensions, that a displacement of the claw-shaped body 4 along the main line, in the direction of arrow 10 in FIG. 1, with the line being entered in the gap between said claws 6 and 7, will result in that the claw-shaped body 3 will pass into this gap and snap into place, as a result of the intrinsic elasticity of the claw-shaped body 4. On the inner side of the claws 6 and 7, as is shown in FIG. 3, the claw-shaped body 4 is provided with a circumferential notch 11, which is arranged to receive the globular body in such a way, that it may swivel and tilt freely, in position between the claws 6 and 7.

The claw-shaped body 4 is designed in such way with regard to the gap between the free ends of the protrusions 8 and 9, that the main line 1 without any difficulty may pass into it, but the globular body 3 may not pass between said protrusions. In this way it is ensured that a tension in the branch line 2 will not result in that the claw-shaped body is pulled from its engagement with the globular body 3. The possibility of the globular body 3 to swivel and tilt freely within the notch 11 in the claw-shaped body 4 implies that the claw-shaped bodies 4 at each instant are placed principally in line with the rest of the branch line 2, when there is a tension in said branch line, e.g. by the pull force illustrated in FIG. 4 by the arrow 12. Therefore, the claw-shaped body will not be pulled off the main line 1, even if the direction of the pull force makes an acute angle to the main line.

Preferably, the claw-shaped body 4 is cast in one piece from a suitable plastics material, while the globular body 3 is fabricated from a metallic material, which is resistant to sea water, and makes it possible during fabrication, to cast the globular body 3 directly upon the main line 1.

As can be seen in the drawing, the claw-shaped body is symmetrically shaped around two perpendicular planes, wherein one of said planes runs in the middle between the claws and comprises the longitudinal axis of the boring 5. In this way, a very simple design is realized, which enables the claw-shaped body 4 to be displaced into engagement with the globular body 3 from each of its sides.

The invention has been described with reference to a preferred embodiment. However, several modifications can be made, without deviating from the concept of the invention. For example, the external shape of the claw-shaped body may vary, so that it is adapted to the way in which it is going to be pulled on and off the globular bodies 3. If desired, this attachment and detachment may be performed by means of automatic machinery.

The invention is not limited to the above described embodiment, but several modifications are possible within the scope of the accompanying claims.

What we claim:

1. A long line for use in long-line fishing, comprising; a main line with detachably attached branch lines, each carrying a respective hook, said branch lines being attached to the main line via globular bodies, which are affixed to said main line and formed by rings having a spherical outer surface, and wherein each branch line is connected to a claw-shaped body, which via snap-in action is arranged to be brought in releasable engagement with one of the globular bodies on the main line, when the claw-shaped body is displaced along the main line.

2. A long line according to claim 1, wherein the claw-shaped body has notches for free swiveling reception of the globular body, resulting in that the claw-shaped body at every instant under tension rotates until it is in line with the branch line, wherein it maintains a position which ensures the best possible attachment upon the globular body.

3. A long line according to claim 2, wherein the free edges of the claws have towards each other pointing protrusions.

4. A long line according to either claim 1 or 2, wherein the globular bodiess are affixed to the main line by directly casting onto the line during fabrication.

5. A long line according to either claim 1 or 2, wherein the globular body is symmetrically shaped and arranged in such way, that it can be moved in or out of engagement with the claw-shaped body from both sides of its claws.

* * * * *